(12) United States Patent
Mu (10) Patent No.: US 10,539,406 B2
(45) Date of Patent: Jan. 21, 2020

(54) METHOD AND APPARATUS FOR CALIBRATING TOOL IN FLANGE COORDINATE SYSTEM OF ROBOT

(71) Applicant: SHENZHEN A&E SMART INSTITUTE CO., LTD., Shenzhen, Guangdong Province (CN)

(72) Inventor: Wenfeng Mu, Shenzhen (CN)

(73) Assignee: SHENZHEN A&E SMART INSTITUTE CO., LTD., Shenzhen, Guangdong Province (CN)

( * ) Notice: Subject to any disclaimer, the term of this patent is extended or adjusted under 35 U.S.C. 154(b) by 248 days.

(21) Appl. No.: 15/526,760

(22) PCT Filed: Nov. 13, 2015

(86) PCT No.: PCT/CN2015/094608
§ 371 (c)(1),
(2) Date: May 14, 2017

(87) PCT Pub. No.: WO2016/074646
PCT Pub. Date: May 19, 2016

(65) Prior Publication Data
US 2017/0322010 A1    Nov. 9, 2017

(30) Foreign Application Priority Data

Nov. 14, 2014  (CN) .......................... 2014 1 0647461

(51) Int. Cl.
*G06F 19/00* (2018.01)
*G01B 5/004* (2006.01)
(Continued)

(52) U.S. Cl.
CPC ............ *G01B 5/004* (2013.01); *B25J 9/1692* (2013.01); *G01B 21/042* (2013.01);
(Continued)

(58) Field of Classification Search
None
See application file for complete search history.

(56) References Cited

U.S. PATENT DOCUMENTS 9,188,973 B2 * 11/2015 Tenney .................... G06T 7/12
9,248,573 B2 *  2/2016 Soe-Knudsen ........ B25J 9/1656
(Continued)

FOREIGN PATENT DOCUMENTS

CN    102087096 A    6/2011
CN    102226677 A    10/2011
(Continued)

OTHER PUBLICATIONS

He Liu, Hui Zeng, "Research on Tool Parameter Calibration of Welding Robot", China New Technologies and Products, Dec. 31, 2013, p. 5, No. 11, China.

*Primary Examiner* — Bhavesh V Amin
(74) *Attorney, Agent, or Firm* — Cheng-Ju Chiang (57) ABSTRACT

A method and an apparatus for calibrating a tool in a flange coordinate system of a robot are disclosed. The method includes: acquiring a rotation angle of each joint of a robot when a to-be-calibrated tool fasted on an end joint mounting portion of the robot moves to a central point of the to-be-calibrated tool and overlaps with a calibration reference point; acquiring calibration information of a central point of a calibrated tool in a flange coordinate system of the robot; and completing calibration of the central point of the to-be-calibrated tool in the flange coordinate system of the robot according to the calibration information of the central point of the calibrated tool and a rotation angle of the to-be calibrated tool.

16 Claims, 4 Drawing Sheets

Acquiring a rotation angle of each joint of a robot when a to-be-calibrated tool fasted on an end joint mounting portion of the robot moves to where a central point of the to-be-calibrated tool overlaps with a calibration reference point — S11

Acquiring calibration information of a central point of a calibrated tool in the flange coordinate system of the robot — S12

Completing calibration of the central point of the to-be-calibrated tool in the flange coordinate system of the robot according to the calibration information of the central point of the calibrated tool and a rotation angle of the to-be-calibrated tool — S13

(51) Int. Cl.
*B25J 9/16* (2006.01)
*G01B 21/04* (2006.01)
*B23Q 17/22* (2006.01)

(52) U.S. Cl.
CPC ............ *G01B 21/047* (2013.01); *B23Q 17/22* (2013.01); *G05B 2219/39019* (2013.01); *G05B 2219/39026* (2013.01); *G05B 2219/50291* (2013.01)

(56) References Cited

U.S. PATENT DOCUMENTS

| | | | | |
|---|---|---|---|---|
| 2005/0131582 | A1* | 6/2005 | Kazi | B25J 9/1697 700/259 |
| 2006/0104788 | A1* | 5/2006 | Ban | B25J 9/1697 414/729 |
| 2008/0234863 | A1* | 9/2008 | Pagel | B25J 9/1692 700/254 |
| 2009/0157226 | A1* | 6/2009 | de Smet | B25J 9/1692 700/254 |
| 2012/0239194 | A1* | 9/2012 | Kagawa | B25J 9/1692 700/254 |
| 2013/0010081 | A1* | 1/2013 | Tenney | A61B 34/30 348/47 |
| 2013/0079928 | A1* | 3/2013 | Soe-Knudsen | B25J 9/1656 700/248 |
| 2015/0266183 | A1* | 9/2015 | Alifragkis | B25J 9/1692 700/254 |
| 2015/0283704 | A1* | 10/2015 | Watanabe | B25J 9/1612 700/259 |
| 2017/0322010 | A1* | 11/2017 | Mu | G01B 5/004 |

FOREIGN PATENT DOCUMENTS

| | | |
|---|---|---|
| CN | 102327174 A | 1/2012 |
| CN | 102566577 A | 7/2012 |
| CN | 102679925 A | 9/2012 |
| CN | 102689118 A | 9/2012 |
| CN | 104006778 A | 8/2014 |
| EP | 1120204 A2 | 8/2001 |

* cited by examiner

Fig. 1

```
┌─────────────────────────────────────────────────────────────────┐
│ Acquiring a first rotation angle and a second rotation angle     │ S121
│ which are rotation angles of each joint of the robot when the   │
│ calibrated tool respectively moves in a first direction and a    │
│ second direction to where the central point of the calibrated   │
│ tool overlaps with the calibration reference point              │
└─────────────────────────────────────────────────────────────────┘
                                  ↓
┌─────────────────────────────────────────────────────────────────┐
│ Substituting the first rotation angle and the second rotation    │ S122
│ angle respectively into the known forward kinematics equation    │
│ of the robot, thereby acquiring transformation matrices and of  │
│ the flange coordinate system of the robot relative to the world │
│ coordinate system, and establishing a following equation ①     │
└─────────────────────────────────────────────────────────────────┘
                                  ↓
┌─────────────────────────────────────────────────────────────────┐
│ Calculating the coordinate of the central point of the          │ S123
│ calibrated tool in the flange coordinate system of the robot    │
│ according a following equation ②                                │
└─────────────────────────────────────────────────────────────────┘
                                  ↓
┌─────────────────────────────────────────────────────────────────┐
│ Acquiring a third rotation angle and a fourth rotation angle    │ S124
│ which are rotation angles of each joint of the robot when the   │
│ calibrated tool respectively moves in a third direction and a   │
│ fourth direction to the central point of the calibrated tool    │
│ overlaps with the calibration reference point                   │
└─────────────────────────────────────────────────────────────────┘
                                  ↓
┌─────────────────────────────────────────────────────────────────┐
│ Substituting the third rotation angle and the fourth rotation   │ S125
│ angle respectively into the known forward kinematics equation   │
│ of the robot, thereby acquiring transformation matrices of the  │
│ flange coordinate system of the robot relative to the world     │
│ coordinate system, and establishing a following equation ③     │
└─────────────────────────────────────────────────────────────────┘
                                  ↓
┌─────────────────────────────────────────────────────────────────┐
│ Obtaining a following equation ④ by arranging the equation ③,  │ S126
│ and again calculating a coordinate of the central point of the  │
│ calibrated tool in the flange coordinate system of the robot    │
│ according the equation ④                                        │
└─────────────────────────────────────────────────────────────────┘
                                  ↓
┌─────────────────────────────────────────────────────────────────┐
│ Acquiring a check coordinate of the central point of the        │ S127
│ calibrated tool in the flange coordinate system of the robot    │
│ according to an average value between and , and determining     │
│ the check coordinate of the central point of the calibrated     │
│ tool in the flange coordinate system of the robot as a final    │
│ coordinate of the central point of the calibrated tool in the   │
│ flange coordinate system of the robot                           │
└─────────────────────────────────────────────────────────────────┘
```

METHOD AND APPARATUS FOR CALIBRATING TOOL IN FLANGE COORDINATE SYSTEM OF ROBOT

CROSS REFERENCE TO RELATED APPLICATIONS

The present application is a 35 U.S.C. § 371 National Phase conversion of International (PCT) Patent Application No. PCT/CN2015/094608, filed on Nov. 13, 2015, which claims benefit of Chinese Patent Application No. 201410647461.8, filed on Nov. 14, 2014, the disclosure of which is incorporated by reference herein. The PCT International Patent Application was filed and published in Chinese.

TECHNICAL FIELD

The present disclosure generally relates to robot technologies, and in particular relate to a method and an apparatus for calibrating a tool in a flange coordinate system of a robot.

BACKGROUND

In the robot programming, operating tasks of a workpiece may generally be defined in a coordinate system such as a flange coordinate system of a robot, so the relationship between a tool coordinate system fastened on a tool and a flange coordinate system where an end joint for fastening the tool should be required firstly before processing the workpiece, that is, the tool coordinate system is calibrated. The calibration of the tool coordinate system is to determine a coordinate of the tool center point in the flange coordinate system and coordinate axis directions of the tool coordinate system relative to the flange coordinate system. A four-point calibration method may be generally adopted during the calibration process of the tool coordinate system in the art to determine the coordinate of the tool center point in the flange coordinate system. In specific, the four-point calibration method is to make the tool center point of a tool coordinate system to be calibrated move in four different directions to a same calibration reference point, such that rotation angles of each joint of the robot during four movement of the tool center point may be acquired; and then acquire the coordinate value of the tool center point in the flange coordinate system according to an acquired rotation angle and four-point calibration algorithm.

What have been found by the applicant of the present disclosure, the tool center point are required to move in four directions to the calibration reference in the four-point calibration method of the art, and many movement paths are required to be selected. That is to say, during the practical calibration operation, at least four times to operate the tool center point move to the calibration reference point will be required in calibration of each tool center point, calibration operations is so complicated that the calibration efficiency of the tool coordinate system is low, and further the processing efficiency of the workpiece will be affected.

SUMMARY

A method and an apparatus for calibrating a tool in a flange coordinate system of a robot are provided for the main technical problem in disclosure, the number of the required movement paths of the tool center point is reduced, and calibration operations is so simple that the calibration efficiency of the tool coordinate system is high.

Aiming at above technical problems, in accordance with a first aspect of the present application, a method for calibrating a tool in a flange coordinate system of a robot is provided, and the method comprising: acquiring a rotation angle of each joint of a robot when a to-be calibrated tool fasted on an end joint mounting portion of the robot moves to where a central point of the to-be-calibrated tool overlaps with a calibration reference point; acquiring calibration information of a central point of a calibrated tool in the flange coordinate system of the robot; and completing calibration of the central point of the to-be-calibrated tool in the flange coordinate system of the robot according to the calibration information of the central point of the calibrated tool and a rotation angle of the to-be-calibrated tool.

Aiming at above technical problems, in accordance with a second aspect of the present application, an apparatus for calibrating a tool in a flange coordinate system of a robot is provided, and the apparatus comprising: a rotation angle acquisition module, configured for acquiring a rotation angle of each joint of a robot when a to-be calibrated tool fasted on an end joint mounting portion of the robot moves to where a central point of the to-be-calibrated tool overlaps with a calibration reference point; a calibration information acquisition module, configured for acquiring calibration information of a central point of a calibrated tool in a flange coordinate system of the robot; and a calibration module, configured for completing calibration of the central point of the to-be-calibrated tool in the flange coordinate system of the robot according to the calibration information of the central point of the calibrated tool and a rotation angle of the to-be-calibrated tool.

The subsequent advantages of the present disclosure may be achieved: different from the art, the rotation angle of each joint of the robot when the central point of the to-be-calibrated tool moves to the calibration reference point and the calibration information of the central point of the calibrated tool in the flange coordinate system of the robot are acquired, and further the calibration of the central point of the to-be-calibrated tool in the flange coordinate system is acquired according to the rotation angle of each joint of the robot when the central point of the to-be-calibrated tool moves to the calibration reference point and the calibration information of the central point of the calibrated tool in the flange coordinate system of the robot. In this way, only one movement to the calibration reference point in one direction during the calibration process of the tool coordinate system of the to-be-calibrated tool is achieved, and thus the number of required movement paths of the tool center point may be reduced. That is to say, only at minimum one time operation for the central point of the to-be-calibrated tool to move to the calibration reference point will be required. To ensure an equal probability of which the matrix $F^{t o}$ is reversible, the present disclosure can reduce 75% operation complexity compared with a four-point calibration method in the art and have simple calibration operations, such that the calibration efficiency of the tool coordinate system is relatively high, and further the calibration efficiency of the tool in the flange coordinate system of the robot will be improved.

BRIEF DESCRIPTION OF THE DRAWINGS

FIG. 2 is a flowchart illustrating the block of acquiring a coordinate of a calibrated tool in the flange coordinate system of the robot in the embodiment of the method for calibrating the tool in the flange coordinate system of the robot according to the present disclosure.

DETAILED DESCRIPTION

The technical solution of the embodiments of the present disclosure will be described more clearly and completely with reference to the accompanying drawings. Apparently, the embodiments described here are only some exemplary embodiments, not all the embodiments. Based on the embodiments described in the present disclosure, one skilled in the art may acquire all other embodiments without any creative work. All these shall be covered within the protection scope of the present disclosure.

Figure 1:
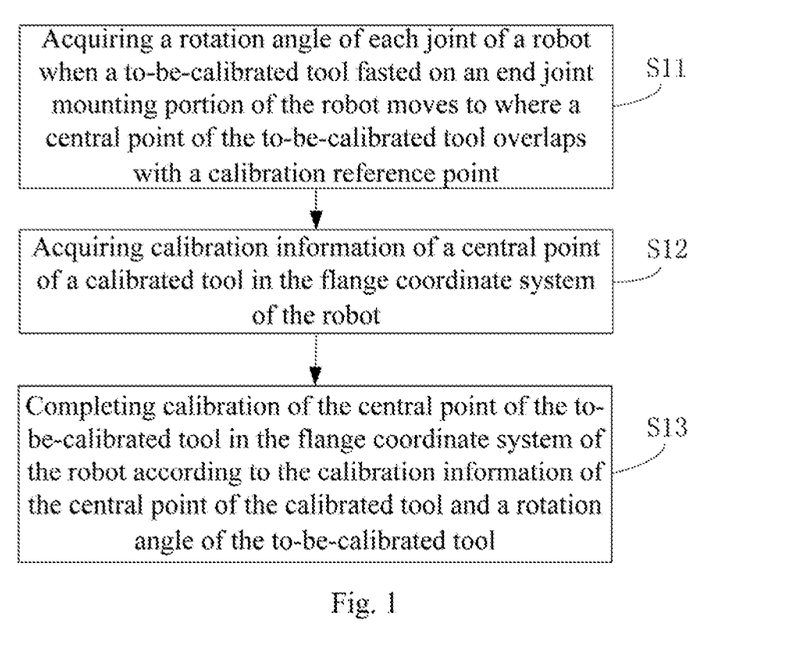
FIG. 1 is a flowchart illustrating an embodiment of a method for calibrating a tool in a flange coordinate system of a robot according to the present disclosure.

As is shown in FIG. 1, the method for calibrating a tool in a flange coordinate system according to an embodiment of the present disclosure includes following blocks.

In block S11, a rotation angle of each joint of a robot when a to-be calibrated tool fasted on an end joint mounting portion of the robot moves to a central point of the to-be-calibrated tool and overlaps with a calibration reference point may be acquired.

The robot in this embodiment may be generally an industrial robot with at least four joints. Preferably, the robot may be an industrial robot with six joints. In another embodiment, the robot may also be another type of a robot such as a primary intelligent robot, which is not limited herein.

After the to-be-calibrated tool has been fasted on an end joint mounting portion of the robot, the to-be-calibrated tool moves such that the central point of the to-be-calibrated tool overlaps with the calibration reference point, and the rotation angle of each joint of the robot may be acquired during the movement of the to-be-calibrated tool. All rotation angles of each joint of the robot in the present disclosure may be acquired via sensors on the each joint. What should be understood, the start point position of the central point may be not required to be limited and may be any point except for the calibration reference point, when measuring the rotation angle of each joint of the robot as the central point moves to the calibration reference point in the present disclosure.

In block S12, calibration information of a central point of a calibrated tool in the flange coordinate system of the robot may be acquired.

Tool center point (TCP) may be the original point of a tool coordinate system. The tool coordinate system may a coordinate system fasted on the tool. The tool may be as a reference object in the tool coordinate system. The calibration of the TCP may also be calibration of the tool coordinate system, which means an identification process to calculate positions and gestures of the tool coordinate system relative to the flange coordinate system, that is to say, to determine a coordinate of the TCP in the flange coordinate system and a coordinate axis direction of the tool coordinate system relative to the flange coordinate system.

In specific, calibration information of a central point of a calibrated tool in the flange coordinate system of the robot may be acquired, which includes that a rotation angle of the calibrated tool and a coordinate of the central point of the calibrated tool in the flange coordinate system of the robot may be acquired. The rotation angle of the calibrated tool may be a rotation angle of each joint of the robot when the calibrated tool fasted on an end joint mounting portion of the robot moves to where the central point of the calibrated tool overlaps with a calibration reference point. The end joint may be as a reference object in the flange coordinate system. In different embodiments, the rotation angle of the calibrated tool and the coordinate of the central point of the calibrated tool in the flange coordinate system of the robot may be obtained directly in a memory in which they have been pre-stored, and may also be obtained via timely measuring or calculating. Only the rotation angle of the calibrated tool may be pre-stored in the memory, for example, and the coordinate of the central point of the calibrated tool in the flange coordinate system may be timely calculated. Or the coordinate of the central point of the calibrated tool in the flange coordinate system and the rotation angle of the calibrated tool may both be pre-stored in the memory. Or again, the coordinate of the central point of the calibrated tool in the flange coordinate system and the rotation angle of the calibrated tool may be timely acquired.

In one embodiment, a specific way to acquire the rotation angle of the calibrated tool may be as follows. The calibrated tool may be fasted on the end joint mounting portion of the robot, and then the rotation angle of each joint of the robot may be acquired when the calibrated tool moves to where the central point of the calibrated tool overlaps with the calibration reference point. Mounting portions where the calibrated and to-be-calibrated tools are fasted should be same. The calibrated tool on the mounting portion moves such that the central point of the calibrated tool overlaps with the calibration reference point, and the rotation angle of each joint of the robot may be acquired during the movement of the calibrated tool. The calibration reference point in this block and the one in the block S11 are the same point. The calibration reference point may be any another point except for the central point of the calibrated tool and the central point of the to-be-calibrated tool. The coordinate of the calibrated reference point in the world coordinate system may be (X Y Z 1).

A specific way to acquire the coordinate of the central point of the calibrated tool in the flange coordinate system of the robot may be a four-point calibration method. Referring to the FIG. 2, the coordinate of the central point of the calibrated tool in the flange coordinate system of the robot may be acquired, which may specifically include the following sub-blocks.

In sub-block S121, a first rotation angle and a second rotation angle may be acquired. The first and second rotation angles are respectively rotation angles of each joint of the robot when the calibrated tool respectively moves in a first direction and a second direction to where the central point of the calibrated tool overlaps with the calibration reference point.

An industrial robot with six joints may be taken to as an example specifically to describe. The calibrated tool may be fasted on the end joint mounting portion of the robot. The calibrated tool moves in the first direction such that the central point of the calibrated tool overlaps with the calibration reference point, and the first rotation angle $(\beta_1^1\ \beta_2^1\ \beta_3^1\ \beta_4^1\ \beta_5^1\ \beta_6^1)$ of each joint of the robot during the movement may be acquired. The calibrated tool moves in the second direction such that the central point of the calibrated tool overlaps with the calibration reference point, and the second rotation angle $(\beta_1^2\ \beta_2^2\ \beta_3^2\ \beta_4^2\ \beta_5^2\ \beta_6^2)$ of each joint of the robot during the movement may be acquired. The first direction and the second direction may be two different directions.

In sub-block S122, the first rotation angle and the second rotation angle may be respectively substituted into a known forward kinematics equation of the robot, such that transformation matrices $F^1$ and $F^2$ of the flange coordinate system of the robot relative to the world coordinate system may be acquired, and a following equation ① may be established.

The equation ① is listed as followed.

$$F^1 T \begin{bmatrix} 0 \\ 0 \\ 0 \\ 1 \end{bmatrix} = F^2 T \begin{bmatrix} 0 \\ 0 \\ 0 \\ 1 \end{bmatrix} = \begin{bmatrix} X \\ Y \\ Z \\ 1 \end{bmatrix} \quad \text{①}$$

In the equation ①, the coordinate of the central point of the calibrated tool in the flange coordinate system is $(X_{ca}\ Y_{ca}\ Z_{ca})$, T is a transformation matrix of the calibrated tool coordinate system relative to the flange coordinate system, which is $$T = \begin{bmatrix} R_{11} & R_{12} & R_{13} & X_{ca} \\ R_{21} & R_{22} & R_{23} & Y_{ca} \\ R_{31} & R_{32} & R_{33} & Z_{ca} \\ 0 & 0 & 0 & 1 \end{bmatrix},$$

three coordinate axis directions of the tool coordinate system relative to the flange coordinate system are respectively $A=[R_{11}\ R_{21}\ R_{31}]$, $B=[R_{12}\ R_{22}\ R_{32}]$ and $C=[R_{13}\ R_{23}\ R_{33}]$, and (X Y Z 1) is the coordinate of the calibration reference point in the world coordinate system.

In sub-block S123, the coordinate $(X_{ca}\ Y_{ca}\ Z_{ca})$ of the central point of the calibrated tool in the flange coordinate system of the robot may be calculated according a following equation ②.

The equation ② is listed as followed.

$$(F^1 - F^2) \begin{bmatrix} X_{ca} \\ Y_{ca} \\ Z_{ca} \\ 1 \end{bmatrix} = \begin{bmatrix} 0 \\ 0 \\ 0 \\ 0 \end{bmatrix}. \quad \text{②}$$

A equation may be acquired by arranging the equation ②, which is listed as followed:

$$\left( \begin{bmatrix} F_{11}^1 - F_{11}^2 & F_{12}^1 - F_{12}^2 & F_{13}^1 - F_{13}^2 \\ F_{21}^1 - F_{21}^2 & F_{22}^1 - F_{22}^2 & F_{23}^1 - F_{23}^2 \\ F_{31}^1 - F_{31}^2 & F_{32}^1 - F_{32}^2 & F_{33}^1 - F_{33}^2 \end{bmatrix} \right) \begin{bmatrix} X_{ca} \\ Y_{ca} \\ Z_{ca} \end{bmatrix} = - \begin{bmatrix} F_{14}^1 - F_{14}^2 \\ F_{24}^1 - F_{24}^2 \\ F_{34}^1 - F_{34}^2 \end{bmatrix},$$

and $F' = \begin{bmatrix} F_{11}^1 - F_{11}^2 & F_{12}^1 - F_{12}^2 & F_{13}^1 - F_{13}^2 \\ F_{21}^1 - F_{21}^2 & F_{22}^1 - F_{22}^2 & F_{23}^1 - F_{23}^2 \\ F_{31}^1 - F_{31}^2 & F_{32}^1 - F_{32}^2 & F_{33}^1 - F_{33}^2 \end{bmatrix}$ may be set and F' is a reversible matrix, then $$\begin{bmatrix} X_{ca} \\ Y_{ca} \\ Z_{ca} \end{bmatrix} = -(F')^{-1} \begin{bmatrix} F_{14}^1 - F_{14}^2 \\ F_{24}^1 - F_{24}^2 \\ F_{34}^1 - F_{34}^2 \end{bmatrix},$$

such that the coordinate $(X_{ca}\ Y_{ca}\ Z_{ca})$ of the central point of the calibrated tool in the flange coordinate system has been calculated out.

The coordinate $(X_{ca}\ Y_{ca}\ Z_{ca})$ of the central point of the calibrated tool in the flange coordinate system shall have been used as the final coordinate of the central point of the calibrated tool in the flange coordinate system. However, for the sake of more accurate calibration of the central point of the calibrated tool in the flange coordinate system, the following sub-blocks S124-S127 shall be further executed in this embodiment.

In sub-block S124, a third rotation angle and a fourth rotation angle may be acquired. The third rotation and fourth rotation angles are respectively rotation angles of each joint of the robot when the calibrated tool respectively moves in a third direction and a fourth direction to where the central point of the calibrated tool overlaps with the calibration reference point.

Similarly to the sub-block S121, the third rotation angle $(\beta_1^3\ \beta_2^3\ \beta_3^3\ \beta_4^3\ \beta_5^3\ \beta_6^3)$ of each joint of the robot when the calibrated tool moves in the third direction to where the central point of the calibrated tool overlaps with the calibration reference point may be acquired, and the fourth rotation angle $(\beta_1^4\ \beta_2^4\ \beta_3^4\ \beta_4^4\ \beta_5^4\ \beta_6^4)$ of each joint of the robot when the calibrated tool moves in the fourth direction to where the central point of the calibrated tool overlaps with the calibration reference point may be acquired. The third direction and the fourth direction are two different directions.

What should be understood, the calibration reference point in sub-blocks S121 and S124 are same calibration reference point, but may be different from the calibration reference point in block S11. When the calibration reference point in sub-blocks S121 and S124 is same as the calibration reference point in block S11, the rotation angles acquired in sub-blocks S121 and S124 may be selected directly as the rotation angle of the calibrated tool acquired in block S11.

In sub-block S125, the third rotation angle and the fourth rotation angle may be substituted into the known forward kinematics equation of the robot respectively, such that transformation matrices $F^3$ and $F^4$ of the flange coordinate system of the robot relative to the world coordinate system may be acquired, and a following equation ③ may be established.

The equation ③ is listed as followed.

$$F^3 T \begin{bmatrix} 0 \\ 0 \\ 0 \\ 1 \end{bmatrix} = F^4 T \begin{bmatrix} 0 \\ 0 \\ 0 \\ 1 \end{bmatrix} = \begin{bmatrix} X \\ Y \\ Z \\ 1 \end{bmatrix}. \quad \text{③}$$

In the equation ③, T is the transformation matrix of the calibrated tool coordinate system relative to the flange coordinate system in sub-block S122, and (X Y Z 1) is the coordinate of the calibration reference point in the world coordinate system.

In sub-block S126, a following equation ④ by arranging the equation ③ may be obtained, and a coordinate $(X'_{ca} Y'_{ca} Z'_{ca})$ of the central point of the calibrated tool in the flange coordinate system of the robot may again be calculated according the equation ④.

The equation ④ is listed as followed.

$$(F^3 - F^4)\begin{bmatrix} X'_{ca} \\ Y'_{ca} \\ Z'_{ca} \\ 1 \end{bmatrix} = \begin{bmatrix} 0 \\ 0 \\ 0 \\ 0 \end{bmatrix}. \quad (4)$$

Similarly to sub-block S123, one more coordinate $(X'_{ca} Y'_{ca} Z'_{ca})$ of the central point of the calibrated tool in the flange coordinate system of the robot may be calculated out.

In sub-block S127, a check coordinate $(X_{ch} Y_{ch} Z_{ch})$ of the central point of the calibrated tool in the flange coordinate system of the robot may be acquired according to an average value between $(X_{ca} Y_{ca} Z_{ca})$ and $(X'_{ca} Y'_{ca} Z'_{ca})$, and the check coordinate $(X_{ch} Y_{ch} Z_{ch})$ of the central point of the calibrated tool in the flange coordinate system of the robot may be determined as a final coordinate of the central point of the calibrated tool in the flange coordinate system of the robot.

The average value between the coordinates $(X_{ca} Y_{ca} Z_{ca})$ and $(X'_{ca} Y'_{ca} Z'_{ca})$ of central points of two calibrated tool may acquired via the four-point calibration method in this embodiment to as the final coordinate of the central point of the calibrated tool in the flange coordinate system of the robot, such that the calibration of the calibrated tool in the flange coordinate system shall be much more accurate.

In block S13, calibration of the central point of the to-be-calibrated tool in the flange coordinate system of the robot may be completed according to the calibration information of the central point of the calibrated tool and a rotation angle of the to-be calibrated tool.

Figure 3:
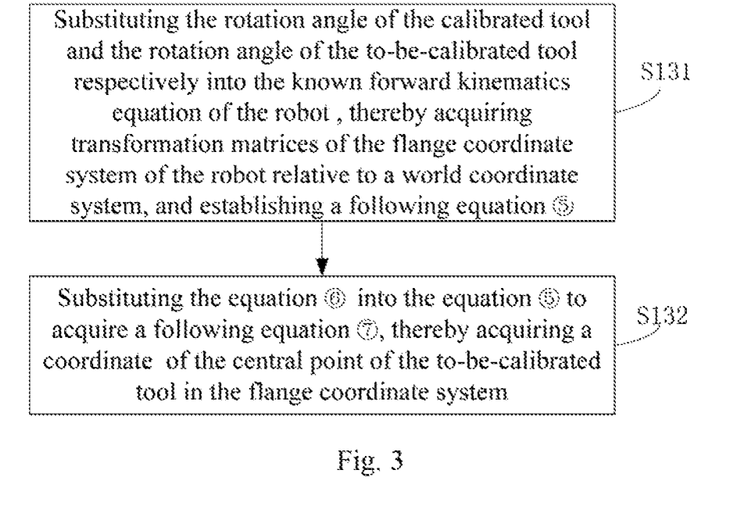
FIG. 3 is a flowchart illustrating the block of completing calibration of the central point of the to-be-calibrated tool in the flange coordinate system of the robot according to the calibration information of the central point of the calibrated tool and a rotation angle of the to-be-calibrated tool in the embodiment of the method for calibrating the tool in the flange coordinate system of the robot according to the present disclosure.

The calibration of the central point of the to-be-calibrated tool in the flange coordinate system of the robot may be completed according to the calibration information of the central point of the calibrated tool and a rotation angle of the to-be calibrated tool. Referring to FIG. 3, the block S13 includes following sub-blocks.

In block S131, the rotation angles of the calibrated tool and the to-be-calibrated tool may be respectively substituted into a known forward kinematics equation of the robot, such that transformation matrices $F^{ca}$ and $F^{to}$ of the flange coordinate system of the robot relative to a world coordinate system may be acquired, and a following equation ⑤ may be established.

The industrial robot with six joints may sequentially be taken as an example specifically to describe. The rotation angle of each joint of the robot, acquired according to the above block S12, when the calibrated tool moves to where the central point of the to-be-calibrated tool overlaps with the calibration reference point is $(\beta_1^{ca} \beta_2^{ca} \beta_3^{ca} \beta_4^{ca} \beta_5^{ca} \beta_6^{ca})$. In specific, the rotation angle $(\beta_1^{ca} \beta_2^{ca} \beta_3^{ca} \beta_4^{ca} \beta_5^{ca} \beta_6^{ca})$ may be substituted into the known forward kinematics equation $F^{ca} = (\beta_1^{ca} \beta_2^{ca} \beta_3^{ca} \beta_4^{ca} \beta_5^{ca} \beta_6^{ca})$ of the robot, such that the transformation matrix $F^{ca}$ of the flange coordinate system relative to the world coordinate system when the central point of the calibrated tool moves to the calibration reference point may be acquired during the calibration process of the tool coordinate system of the calibrated tool.

Similarly, the rotation angle of each joint of the robot, acquired according to the above block S11, when the to-be-calibrated tool moves to the central point of the to-be-calibrated tool and overlaps with the calibration reference point is $(\beta_1^{to} \beta_2^{to} \beta_3^{to} \beta_4^{to} \beta_5^{to} \beta_6^{to})$. The rotation angle $(\beta_1^{to} \beta_2^{to} \beta_3^{to} \beta_4^{to} \beta_5^{to} \beta_6^{to})$ may be substituted into the known forward kinematics equation $F^{to} = (\beta_1^{to} \beta_2^{to} \beta_3^{to} \beta_4^{to} \beta_5^{to} \beta_6^{to})$ of the robot, such that the transformation matrix $F^{to}$ of the flange coordinate system relative to the world coordinate system when the central point of the to-be-calibrated tool moves to the calibration reference point may be acquired during the calibration process of the tool coordinate system of the to-be-calibrated tool. The transformation matrix $F^{to}$ is specifically listed as followed.

$$F^{to} = \begin{bmatrix} F_{11}^{to} & F_{12}^{to} & F_{13}^{to} & F_{14}^{to} \\ F_{21}^{to} & F_{22}^{to} & F_{23}^{to} & F_{24}^{to} \\ F_{31}^{to} & F_{32}^{to} & F_{33}^{to} & F_{34}^{to} \end{bmatrix}. \quad (6)$$

A following equation ⑤ may be established.

$$F^{ca} \begin{bmatrix} X_{ca} \\ Y_{ca} \\ Z_{ca} \\ 1 \end{bmatrix} = F^{to} \begin{bmatrix} X_{to} \\ Y_{to} \\ Z_{to} \\ 1 \end{bmatrix}. \quad (5)$$

In the equation ⑤, $(X_{to} Y_{to} Z_{to})$ is the coordinate of the central point of the to-be-calibrated tool in the flange coordinate system, and the coordinate of the central point of the calibrated tool in the flange coordinate system is $(X_{ca} Y_{ca} Z_{ca})$.

What should be understood, the coordinate $(X_{ca} Y_{ca} Z_{ca})$ of the central point of the calibrated tool in the flange coordinate system means the finally-determined coordinate of the calibrated tool in the flange coordinate system, such as the coordinate of the calibrated tool in the flange coordinate system determined in the sub-blocks S121-S127. That is to say, the coordinate $(X_{ca} Y_{ca} Z_{ca})$ of the central point of the calibrated tool in the flange coordinate system herein is the check coordinate $(X_{ch} Y_{ch} Z_{ch})$ of the calibrated tool in the flange coordinate system of the robot in sub-block S127.

In sub-block S132, the equation ⑥ may be substituted into the equation ⑤ to acquire a following equation ⑦, such that the coordinate $(X_{to} Y_{to} Z_{to})$ of the central point of the to-be-calibrated tool in the flange coordinate system may be acquired.

The equation ⑦ is listed as followed.

$$\begin{bmatrix} X_{to} \\ Y_{to} \\ Z_{to} \end{bmatrix} = (F'^{to})^T \left( F^{ca} \begin{bmatrix} X_{ca} \\ Y_{ca} \\ Z_{ca} \\ 1 \end{bmatrix} - \begin{bmatrix} F_{14}^2 \\ F_{24}^2 \\ F_{34}^2 \end{bmatrix} \right). \quad (7)$$

In the equation ⑦, $$F'^{to} = \begin{bmatrix} F_{11}^{to} & F_{12}^{to} & F_{13}^{to} \\ F_{21}^{to} & F_{22}^{to} & F_{23}^{to} \\ F_{31}^{to} & F_{32}^{to} & F_{33}^{to} \end{bmatrix},$$

and the $F'^{to}$ is an orthogonal matrix.

The specific derivation process of the above equation ⑦ is described as followed. A transformation matrix of the calibrated tool in the tool coordinate system relative to the world coordinate system may be set as $T^{ca}$ and a transformation matrix of the to-be-calibrated tool in the tool coordinate system relative to the world coordinate system may be set as $T^{to}$. As the central points of the calibrated tool and the to-be-calibrated tool both moves a same calibration reference point, then $$F^{ca}T^{ca}\begin{bmatrix}0\\0\\0\\1\end{bmatrix} = F^{to}T^{to}\begin{bmatrix}0\\0\\0\\1\end{bmatrix} = \begin{bmatrix}X\\Y\\Z\\1\end{bmatrix}, \quad ⑧$$

in which $$T^{ca} = \begin{bmatrix} R_{11}^{ca} & R_{12}^{ca} & R_{13}^{ca} & X_0^{ca} \\ R_{21}^{ca} & R_{22}^{ca} & R_{23}^{ca} & Y_0^{ca} \\ R_{31}^{ca} & R_{32}^{ca} & R_{33}^{ca} & Z_0^{ca} \\ 0 & 0 & 0 & 1 \end{bmatrix} \text{ and } T^{to} = \begin{bmatrix} R_{11}^{to} & R_{12}^{to} & R_{13}^{to} & X_0^{to} \\ R_{21}^{to} & R_{22}^{to} & R_{23}^{to} & Y_0^{to} \\ R_{31}^{to} & R_{32}^{to} & R_{33}^{to} & Z_0^{to} \\ 0 & 0 & 0 & 1 \end{bmatrix}.$$

The equation ⑧ may be further arranged, then $$F^{ca}\begin{bmatrix}X^{ca}\\Y^{ca}\\Z^{ca}\\1\end{bmatrix} = F^{to}\begin{bmatrix}X^{to}\\Y^{to}\\Z^{to}\\1\end{bmatrix}. \quad ⑨$$

As $$F^{to} = \begin{bmatrix} F_{11}^{to} & F_{12}^{to} & F_{13}^{to} & F_{14}^{to} \\ F_{21}^{to} & F_{22}^{to} & F_{23}^{to} & F_{24}^{to} \\ F_{31}^{to} & F_{32}^{to} & F_{33}^{to} & F_{34}^{to} \end{bmatrix},$$

what listed as followed may be acquired according to the equation ⑨, $$F^{ca}\begin{bmatrix}X^{ca}\\Y^{ca}\\Z^{ca}\\1\end{bmatrix} = \begin{bmatrix} F_{11}^{to}X^{to} + F_{12}^{to}Y^{to} + F_{13}^{to}Z^{to} + F_{14}^{to} \\ F_{21}^{to}X^{to} + F_{22}^{to}Y^{to} + F_{23}^{to}Z^{to} + F_{24}^{to} \\ F_{31}^{to}X^{to} + F_{32}^{to}Y^{to} + F_{33}^{to}Z^{to} + F_{34}^{to} \end{bmatrix}. \quad ⑩$$

$$F'^{to} = \begin{bmatrix} F_{11}^{to} & F_{12}^{to} & F_{13}^{to} \\ F_{21}^{to} & F_{22}^{to} & F_{23}^{to} \\ F_{31}^{to} & F_{32}^{to} & F_{33}^{to} \end{bmatrix}$$

may be set and $F'^{to}$ is an orthogonal matrix, and then what listed as followed may be acquired according to the equation ⑩

$$F^{ca}\begin{bmatrix}X^{ca}\\Y^{ca}\\Z^{ca}\\1\end{bmatrix} = F'^{to}\begin{bmatrix}X^{to}\\Y^{to}\\Z^{to}\end{bmatrix} + \begin{bmatrix}F_{14}^{to}\\F_{24}^{to}\\F_{34}^{to}\end{bmatrix}. \quad ⑪$$

As $F'^{to}$ is an orthogonal matrix, that is to say, $F'^{to}$ is a reversible matrix, $(F'^{to})^{-1} = (F'^{to})^T$ may be obtained according to properties of the orthogonal matrix. Therefore, the following equation ⑦ may be acquired according to the above equation ⑪.

$$\begin{bmatrix}X_{to}\\Y_{to}\\Z_{to}\end{bmatrix} = (F'^{to})^T\left(F^{ca}\begin{bmatrix}X_{ca}\\Y_{ca}\\Z_{ca}\\1\end{bmatrix} - \begin{bmatrix}F_{14}^{to}\\F_{24}^{to}\\F_{34}^{to}\end{bmatrix}\right). \quad ⑦$$

Thus the above equation ⑦ may be acquired, and further the vector matrix $F'^{to}$ of the $1^{st}$-$3^{rd}$ column in the known transformation matrix $F^{to}$, the transformation matrix $F^{ca}$, the coordinate $(X_0^{ca}\ Y_0^{ca}\ Z_0^{ca})$ of the central point of the calibrated tool in the flange coordinate system and a vector $$\begin{bmatrix}F_{14}^{to}\\F_{24}^{to}\\F_{34}^{to}\end{bmatrix}$$

of the $4^{th}$ column in the transformation matrix $F^{ca}$ may be substituted into the equation ⑦, such that the coordinate of the central point of the to-be-calibrated tool in the flange coordinate system may be acquired. In this way, position calibration of the original point of the coordinate system during the calibration of the tool coordinate system of the to-be-calibrated tool shall be completed. In addition, calibration of coordinate axis direction vectors in the tool coordinate system may further performed such that the calibration of the tool coordinate system of the to-be-calibrated tool shall be completed.

In this embodiment, the rotation angle of each joint of the robot when the central point of the to-be-calibrated tool moves to the calibration reference point and the calibration information of the central point of the calibrated tool in the flange coordinate system of the robot are acquired, and further the calibration of the central point of the to-be-calibrated tool in the flange coordinate system is acquired according to the rotation angle of each joint of the robot when the central point of the to-be-calibrated tool moves to the calibration reference point and the calibration information of the central point of the calibrated tool in the flange coordinate system of the robot. In this way, only one movement to the calibration reference point in one direction during the calibration process of the tool coordinate system of the to-be-calibrated tool is achieved, and thus the number of required movement paths of the tool center point may be reduced. That is to say, only at minimum one time operation for the central point of the to-be-calibrated tool to move to the calibration reference point will be required. To ensure an equal probability of which the matrix $F^{t'o}$ is reversible, the present disclosure can reduce 75% operation complexity compared with a four-point calibration method in the art and have simple calibration operations, such that the calibration efficiency of the tool coordinate system is relatively high, and further the calibration efficiency of the tool in the flange coordinate system of the robot will be improved.

What should be understood, the sequence of the blocks in the method of the present disclosure are just for convenient description, but should not have a restrictive effect. For example, the blocks S11 and S12 don't have priority, that is to say, the block S11 may be firstly executed and then the block S12 may be executed, or the block S12 may be firstly executed and then the block S11 may be executed, or the blocks S11 and S12 may be executed simultaneously.

In addition, when there are a plurality of calibrated tools, calibration information of the central point of a first calibrated tool, a previous calibrated tool or any one calibrated tool in the flange coordinate system of the robot may be selected to as the calibration information of the central point of the calibrated tool in the above method, such that calibration of the central point of the to-be-calibrated tool in the flange coordinate system may be acquired. Wherein, the above first or previous calibrated tool may be defined according to the sequence in which tools may be calibrated. Of course, calibration information of central points of at least two previous calibrated tools in the flange coordinate system may also be selected and weighted-averaged. Calibration of the central point of the to-be-calibrated tool in the flange coordinate system of the robot according to the weighted-averaged calibration information of the central point of the calibrated tool and the rotation angle of the to-be calibrated tool may be completed.

The method for calibrating a tool in the flange coordinate system of the robot in the present disclosure may be applied for processing workpieces. After calibration of a to-be-calibrated tool has been completed, the robot will utilize the to-be-calibrated tool whose calibration in the flange coordinate system has been completed to process a workpiece. As the present disclosure can reduce 75% operation complexity compared with the four-point calibration method in the art, and have simple calibration operations, the calibration efficiency of the tool coordinate system is relatively high, and further the calibration efficiency of the tool in the flange coordinate system of the robot will be improved.

Figure 4:
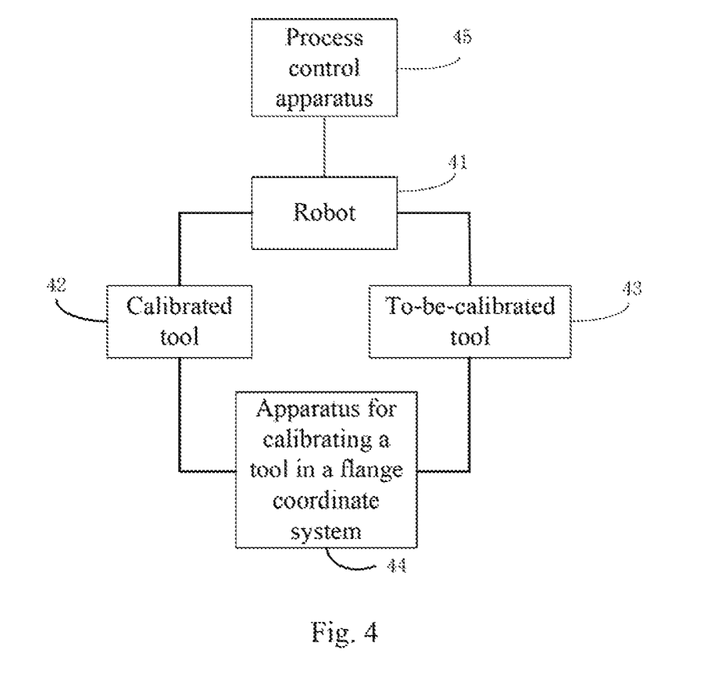
FIG. 4 is a schematic view illustrating a workpiece processing system where an apparatus for calibrating a tool in a flange coordinate system of a robot locates according to the present disclosure.
Figure 5:
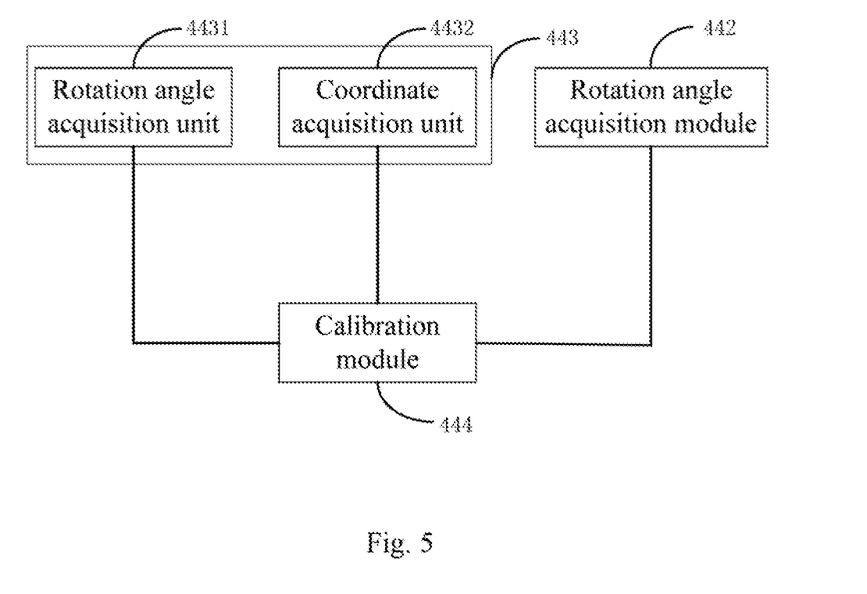
FIG. 5 is a schematic view illustrating an embodiment of an apparatus for calibrating a tool in a flange coordinate system of a robot according to the present disclosure.

Referring to FIGS. 4-5, FIG. 4 is a schematic view illustrating a processing system where an apparatus for calibrating a tool in a flange coordinate system of a robot locates according to the present disclosure, and FIG. 5 is a schematic view illustrating an embodiment of an apparatus for calibrating a tool in a flange coordinate system of a robot according to the present disclosure.

The processing system may include a robot 41, a calibrated tool 42, a to-be-calibrated tool 43, an apparatus 44 for calibrating a tool in the flange coordinate system of the robot and a process control apparatus 45. The robot 41 may specifically be an industrial robot with at least four joints. The apparatus 44 for calibrating a tool in the flange coordinate system of the robot may include a rotation angle acquisition module 442, a calibration information acquisition module 443, and a calibration module 444. Specific function of each module may be described as followed.

The rotation angle acquisition module 442 may be configured for acquiring a rotation angle of each joint of a robot 41 when a to-be calibrated tool 43 fasted on an end joint mounting portion of the robot moves to where a central point of the to-be-calibrated tool 43 overlaps with a calibration reference point.

The calibration information acquisition module 443 may be configured for acquiring calibration information of a central point of the calibrated tool 42 in the flange coordinate system of the robot 41.

In specific, the calibration information acquisition module 443 may include a rotation angle acquisition unit 4431 and a coordinate acquisition unit 4432. The rotation angle acquisition unit 4431 may be configured for acquiring a rotation angle of the calibrated tool 42. The rotation angle of the calibrated tool 42 may be the rotation angle of each joint of the robot 41 when the calibrated tool 42 fastened on an end joint mounting portion of the robot 41 moves to where the central point of the calibrated tool 42 overlaps with the calibration reference point. The coordinate acquisition unit 4432 may be configured for acquiring the coordinate of the central point of the calibrated tool 42 in the flange coordinate system of the robot 41.

In different embodiments, the rotation angle of the calibrated tool and the coordinate of the central point of the calibrated tool in the flange coordinate system of the robot may be obtained directly in a memory in which they have been pre-stored, and may also be obtained via timely measuring or calculating. For example, the calibration information acquisition module 443 may further include the memory (not shown). The memory may be only configured for pre-storing the rotation angle of the calibrated tool, and the coordinate acquisition unit may timely calculate the coordinate of the central point of the calibrated tool in the flange coordinate system according to the rotation angle of the calibrated tool pre-stored in the memory. Or the memory may be simultaneously configured for pre-storing the coordinate of the central point of the calibrated tool in the flange coordinate system and the rotation angle of the calibrated tool. Or again, the coordinate of the central point of the calibrated tool in the flange coordinate system and the rotation angle of the calibrated tool may be timely acquired as described below by the rotation angle acquisition unit 4431 and the coordinate acquisition unit 4432.

In specific, the rotation angle acquisition unit 4431 may be configured for acquiring the rotation angle of each joint of the robot 41 when the calibrated tool 42 fastened on an end joint mounting portion of the robot 41 moves to where the central point of the calibrated tool 42 overlaps with the calibration reference point. The calibration reference point in rotation angle acquisition unit 4431 and the one in the rotation angle acquisition module 442 are the same point. The calibration reference point may be any another point except for the central point of the calibrated tool 42 and the central point of the to-be-calibrated tool 43. The coordinate of the calibrated reference point in the world coordinate system may be (X Y Z 1).

In specific, the coordinate acquisition unit 4432 may be configured for:

acquiring a first rotation angle and a second rotation angle, which are respectively rotation angles of each joint of the robot 41 when the calibrated tool 42 respectively moves in a first direction and a second direction to where the central point of the calibrated tool 42 overlaps with the calibration reference point;

substituting the first rotation angle and the second rotation angle respectively into a known forward kinematics equation of the robot, thereby acquiring transformation matrices $F^1$ and $F^2$ of the flange coordinate system of the robot relative to the world coordinate system, and establishing a following equation ①, $$F^1 T \begin{bmatrix} 0 \\ 0 \\ 0 \\ 1 \end{bmatrix} = F^2 T \begin{bmatrix} 0 \\ 0 \\ 0 \\ 1 \end{bmatrix} = \begin{bmatrix} X \\ Y \\ Z \\ 1 \end{bmatrix}, \quad (1)$$

in which T is a transformation matrix of the calibrated tool coordinate system relative to the flange coordinate system and (X Y Z 1) is the coordinate of the calibration reference point in the world coordinate system;

calculating the coordinate ($X_{ca}$ $Y_{ca}$ $Z_{ca}$) of the central point of the calibrated tool 42 in the flange coordinate system of the robot according a following equation ②, $$(F^1 - F^2) \begin{bmatrix} X_{ca} \\ Y_{ca} \\ Z_{ca} \\ 1 \end{bmatrix} = \begin{bmatrix} 0 \\ 0 \\ 0 \\ 0 \end{bmatrix}; \quad (2)$$

acquiring a third rotation angle and a fourth rotation angle, which are respectively rotation angles of each joint of the robot 41 when the calibrated tool 42 respectively moves in a third direction and a fourth direction to where the central point of the calibrated tool 42 overlaps with the calibration reference point;

substituting the third rotation angle and the fourth rotation angle respectively into the known forward kinematics equation of the robot, thereby acquiring transformation matrices $F^3$ and $F^4$ of the flange coordinate system of the robot relative to the world coordinate system, and establishing a following equation ③, $$F^3 T \begin{bmatrix} 0 \\ 0 \\ 0 \\ 1 \end{bmatrix} = F^4 T \begin{bmatrix} 0 \\ 0 \\ 0 \\ 1 \end{bmatrix} = \begin{bmatrix} X \\ Y \\ Z \\ 1 \end{bmatrix}, \quad (3)$$

in which T is the transformation matrix of the calibrated tool coordinate system relative to the flange coordinate system and (X Y Z 1) is the coordinate of the calibration reference point in the world coordinate system;

obtaining a following equation ④ by arranging the equation ③, and calculating again a coordinate ($X'_{ca}$ $Y'_{ca}$ $Z'_{ca}$) of the central point of the calibrated tool in the flange coordinate system of the robot according the equation ④, $$(F^3 - F^4) \begin{bmatrix} X'_{ca} \\ Y'_{ca} \\ Z'_{ca} \\ 1 \end{bmatrix} = \begin{bmatrix} 0 \\ 0 \\ 0 \\ 0 \end{bmatrix}; \quad (4)$$

and acquiring a check coordinate ($X_{ch}$ $Y_{ch}$ $Z_{ch}$) of the central point of the calibrated tool 42 in the flange coordinate system of the robot according to an average value between ($X_{ca}$ $Y_{ca}$ $Z_{ca}$) and ($X'_{ca}$ $Y'_{ca}$ $Z'_{ca}$), and determining the check coordinate ($X_{ch}$ $Y_{ch}$ $Z_{ch}$) of the central point of the calibrated tool 42 in the flange coordinate system of the robot as a final coordinate of the central point of the calibrated tool 42 in the flange coordinate system of the robot.

Of course, in other embodiments, the coordinate acquisition unit may directly determine the coordinate ($X_{ca}$ $Y_{ca}$ $Z_{ca}$) of the central point of the calibrated tool in the flange coordinate system of the robot as the final coordinate of the central point of the calibrated tool in the flange coordinate system of the robot.

In specific, The calibration module 444 may be configured for:

substituting the rotation angle of the calibrated tool 42 and the to-be-calibrated tool 43 respectively into the known forward kinematics equation of the robot, thereby acquiring transformation matrices $F^{ca}$ and $F^{to}$ of the flange coordinate system of the robot relative to a world coordinate system, and establishing a following equation ⑤, $$F^{ca} \begin{bmatrix} X_{ca} \\ Y_{ca} \\ Z_{ca} \\ 1 \end{bmatrix} = F^{to} \begin{bmatrix} X_{to} \\ Y_{to} \\ Z_{to} \\ 1 \end{bmatrix}, \quad (5)$$

in which ($X_{to}$ $Y_{to}$ $Z_{to}$) is the coordinate of the central point of the to-be-calibrated tool in the flange coordinate system, the coordinate of the central point of the calibrated tool in the flange coordinate system is ($X_{ca}$ $Y_{ca}$ $Z_{ca}$), and the transformation matrix $F^{to}$ of the flange coordinate system of the robot relative to the world coordinate system is specifically listed as a equation ⑥, $$F^{to} = \begin{bmatrix} F^{to}_{11} & F^{to}_{12} & F^{to}_{13} & F^{to}_{14} \\ F^{to}_{21} & F^{to}_{22} & F^{to}_{23} & F^{to}_{24} \\ F^{to}_{31} & F^{to}_{32} & F^{to}_{33} & F^{to}_{34} \end{bmatrix}; \quad (6)$$

substituting the equation ⑥ into the equation ⑤ to acquire a following equation ⑦, thereby acquiring the coordinate ($X_{to}$ $Y_{to}$ $Z_{to}$) of the central point of the to-be-calibrated tool in the flange coordinate system, $$\begin{bmatrix} X_{to} \\ Y_{to} \\ Z_{to} \end{bmatrix} = (F'^{to})^T \left( F^{ca} \begin{bmatrix} X_{ca} \\ Y_{ca} \\ Z_{ca} \\ 1 \end{bmatrix} - \begin{bmatrix} F^{to}_{14} \\ F^{to}_{24} \\ F^{to}_{34} \end{bmatrix} \right),$$

in which $$F'^{to} = \begin{bmatrix} F^{to}_{11} & F^{to}_{12} & F^{to}_{13} \\ F^{to}_{21} & F^{to}_{22} & F^{to}_{23} \\ F^{to}_{31} & F^{to}_{32} & F^{to}_{33} \end{bmatrix}$$

and the $F'^{to}$ is an orthogonal matrix.

What should be understood, when there are a plurality of calibrated tools, the calibration information acquisition module 443 may select calibration information of the central point of a first calibrated tool, a previous calibrated tool or any one calibrated tool in the flange coordinate system of the robot to as the calibration information of the central point of the calibrated tool in the above method. The calibration module 444 may acquire calibration of the central point of the to-be-calibrated tool in the flange coordinate system according to the calibration information selected by the calibration information module 443. Wherein, the above first or previous calibrated tool may be defined according to the sequence in which tools may be calibrated. Of course, the calibration information module 443 may also select and weighted-average calibration information of central points of at least two previous calibrated tools in the flange coordinate system. The calibration module 444 may complete calibration of the central point of the to-be-calibrated tool in the flange coordinate system of the robot according to the weighted-averaged calibration information of the central point of the calibrated tool and the rotation angle of the to-be calibrated tool.

The process control apparatus 45 may be configured for processing a workpiece by the robot 41 which utilizes the to-be-calibrated tool 43, wherein calibration of the to-be-calibrated tool in the flange coordinate system has been completed.

Of course, the apparatus for calibrating a tool in the flange coordinate system in the present disclosure may not be limited to be used for the above workpiece processing system. The apparatus for calibrating a tool in the flange coordinate system in the present disclosure may be used as an independent device in any system in which calibration is required.

In the present disclosure, the rotation angle of each joint of the robot when the central point of the to-be-calibrated tool moves to the calibration reference point and the calibration information of the central point of the calibrated tool in the flange coordinate system of the robot are acquired, and further the calibration of the central point of the to-be-calibrated tool in the flange coordinate system is acquired according to the rotation angle of each joint of the robot when the central point of the to-be-calibrated tool moves to the calibration reference point and the calibration information of the central point of the calibrated tool in the flange coordinate system of the robot. In this way, only one movement to the calibration reference point in one direction during the calibration process of the tool coordinate system of the to-be-calibrated tool is achieved, and thus the number of required movement paths of the tool center point may be reduced. That is to say, only at minimum one time operation for the central point of the to-be-calibrated tool to move to the calibration reference point will be required. To ensure an equal probability of which the matrix $F^{t'o}$ is reversible, the present disclosure can reduce 75% operation complexity compared with a four-point calibration method in the art and have simple calibration operations, such that the calibration efficiency of the tool coordinate system is relatively high, and further the calibration efficiency of the tool in the flange coordinate system of the robot will be improved.

The above description depicts merely some exemplary embodiments of the present disclosure, but does not mean to limit the scope of the present disclosure. Any equivalent structure or flow transformations made to the present disclosure, or any direct or indirect applications of the present disclosure on other related fields, shall all be covered within the protection of the present disclosure.

What is claimed is:

1. A method for calibrating a tool in a flange coordinate system of a robot, wherein the robot comprises a mounting portion having an end joint; the method comprising:
   acquiring a rotation angle of each joint of the robot when a to-be calibrated tool fasted on the end joint of the mounting portion of the robot moves to where a central point of the to-be-calibrated tool overlaps with a calibration reference point;
   acquiring calibration information of a central point of a calibrated tool in the flange coordinate system of the robot; and
   completing calibration of the central point of the to-be-calibrated tool in the flange coordinate system of the robot according to the calibration information of the central point of the calibrated tool and a rotation angle of the to-be-calibrated tool;
   wherein the acquiring calibration information of the central point of the calibrated tool in the flange coordinate system of the robot comprises:
   acquiring a rotation angle of the calibrated tool and a coordinate of the central point of the calibrated tool in the flange coordinate system of the robot, and the rotation angle of the calibrated tool being an rotation angle of each joint of the robot when the calibrated tool fasted on the end joint of the mounting portion of the robot moves to where the central point of the calibrated tool overlaps with the calibration reference point;
   wherein only the rotation angle of the calibrated tool is pre-stored in a memory, and the coordinate of the central point of the calibrated tool in the flange coordinate system of the robot is timely calculated according to the rotation angle of the calibrated tool pre-stored in the memory; or
   the coordinate of the central point of the calibrated tool in the flange coordinate system of the robot and the rotation angle of the calibrated tool are both pre-stored in the memory.

2. The method according to claim 1, wherein the acquiring calibration information of the central point of the calibrated tool in the flange coordinate system of the robot comprises:
   acquiring calibration information of a central point of a first calibrated tool in the flange coordinate system of the robot; and
   the completing calibration of the central point of the to-be-calibrated tool in the flange coordinate system of the robot according to the calibration information of the central point of the calibrated tool and the rotation angle of the to-be-calibrated tool comprises:
   completing calibration of the central point of the to-be-calibrated tool in the flange coordinate system of the robot according to the calibration information of the central point of the first calibrated tool and the rotation angle of the to-be-calibrated tool.

3. The method according to claim 1, wherein the acquiring calibration information of the central point of the calibrated tool in the flange coordinate system of the robot comprises:
   acquiring calibration information of a central point of a previous calibrated tool in the flange coordinate system of the robot; and
   the completing calibration of the central point of the to-be-calibrated tool in the flange coordinate system of the robot according to the calibration information of the central point of the calibrated tool and the rotation angle of the to-be-calibrated tool comprises:
   completing calibration of the central point of the to-be-calibrated tool in the flange coordinate system of the robot according to the calibration information of the central point of the previous calibrated tool and the rotation angle of the to-be-calibrated tool.

4. The method according to claim 1, wherein the acquiring calibration information of the central point of the calibrated tool in the flange coordinate system of the robot comprises:

acquiring and weighted-averaging calibration information of central points of at least two previous calibrated tools in the flange coordinate system of the robot; and the completing calibration of the central point of the to-be-calibrated tool in the flange coordinate system of the robot according to the calibration information of the central point of the calibrated tool and the rotation angle of the to-be-calibrated tool comprises:

completing calibration of the central point of the to-be-calibrated tool in the flange coordinate system of the robot according to the weighted-averaged calibration information of the central points of the at least two previous calibrated tools and the rotation angle of the to-be-calibrated tool.

5. The method according to claim 1, wherein the completing calibration of the central point of the to-be-calibrated tool in the flange coordinate system of the robot according to the calibration information of the central point of the calibrated tool and the rotation angle of the to-be-calibrated tool comprises:

substituting the rotation angle of the calibrated tool and the rotation angle of the to-be-calibrated tool into a known forward kinematics equation of the robot respectively, thereby acquiring transformation matrices $F^{ca}$ and $F^{to}$ of the flange coordinate system of the robot relative to a world coordinate system, and establishing a following equation (5);

$$F^{ca}\begin{bmatrix} X_{ca} \\ Y_{ca} \\ Z_{ca} \\ 1 \end{bmatrix} = F^{to}\begin{bmatrix} X_{to} \\ Y_{to} \\ Z_{to} \\ 1 \end{bmatrix}; \qquad (5)$$

in which $(X_{to}, Y_{to}, Z_{to})$ is the coordinate of the central point of the to-be-calibrated tool in the flange coordinate system, the coordinate of the central point of the calibrated tool in the flange coordinate system is $(X_{ca}, Y_{ca}, Z_{ca})$, and the transformation matrix $F^{to}$ of the flange coordinate system of the robot relative to the world coordinate system is followed as an equation (6);

$$F^{to} = \begin{bmatrix} F^{to}_{11} & F^{to}_{12} & F^{to}_{13} & F^{to}_{14} \\ F^{to}_{21} & F^{to}_{22} & F^{to}_{23} & F^{to}_{24} \\ F^{to}_{31} & F^{to}_{32} & F^{to}_{33} & F^{to}_{34} \end{bmatrix}; \qquad (6)$$

and substituting the equation (6) into the equation (5) to acquire a following equation (7), thereby acquiring the coordinate $(X_{to}, Y_{to}, Z_{to})$ of the central point of the to-be-calibrated tool in the flange coordinate system;

$$\begin{bmatrix} X_{to} \\ Y_{to} \\ Z_{to} \end{bmatrix} = (F'^{to})^T \left( F^{ca}\begin{bmatrix} X_{ca} \\ Y_{ca} \\ Z_{ca} \\ 1 \end{bmatrix} - \begin{bmatrix} F^{to}_{14} \\ F^{to}_{24} \\ F^{to}_{34} \end{bmatrix} \right); \qquad (7)$$

in which $$F'^{to} = \begin{bmatrix} F^{to}_{11} & F^{to}_{21} & F^{to}_{13} \\ F^{to}_{21} & F^{to}_{22} & F^{to}_{23} \\ F^{to}_{31} & F^{to}_{32} & F^{to}_{33} \end{bmatrix},$$

and the $F'^{to}$ is an orthogonal matrix.

6. The method according to claim 1, wherein the completing calibration of the central point of the to-be-calibrated tool in the flange coordinate system of the robot according to the calibration information of the central point of the calibrated tool and the rotation angle of the to-be-calibrated tool comprises:

substituting the rotation angle of the calibrated tool and the rotation angle of the to-be-calibrated tool into the known forward kinematics equation of the robot respectively, thereby acquiring transformation matrices $F^{ca}$ and $F^{to}$ of the flange coordinate system of the robot relative to a world coordinate system, and establishing a following equation (5);

$$F^{ca}\begin{bmatrix} X_{ca} \\ Y_{ca} \\ Z_{ca} \\ 1 \end{bmatrix} = F^{to}\begin{bmatrix} X_{to} \\ Y_{to} \\ Z_{to} \\ 1 \end{bmatrix}; \qquad (5)$$

in which $(X_{to}, Y_{to}, Z_{to})$ is the coordinate of the central point of the to-be-calibrated tool in the flange coordinate system, a coordinate of the central point of the calibrated tool in the flange coordinate system is $(X_{ca}, Y_{ca}, Z_{ca})$, and the transformation matrix $F^{to}$ of the flange coordinate system of the robot relative to the world coordinate system is followed as an equation (6);

$$F^{to} = \begin{bmatrix} F^{to}_{11} & F^{to}_{21} & F^{to}_{13} & F^{to}_{14} \\ F^{to}_{21} & F^{to}_{22} & F^{to}_{23} & F^{to}_{24} \\ F^{to}_{31} & F^{to}_{32} & F^{to}_{33} & F^{to}_{34} \end{bmatrix}; \qquad (6)$$

and substituting the equation (6) into the equation (5) to acquire a following equation (7), thereby acquiring a coordinate $(X_{to}, Y_{to}, Z_{to})$ of the central point of the to-be-calibrated tool in the flange coordinate system;

$$\begin{bmatrix} X_{ca} \\ Y_{ca} \\ Z_{ca} \end{bmatrix} = (F'^{to})^T \left( F^{ca}\begin{bmatrix} X_{ca} \\ Y_{ca} \\ Z_{ca} \\ 1 \end{bmatrix} - \begin{bmatrix} F^2_{14} \\ F^2_{24} \\ F^2_{34} \end{bmatrix} \right); \qquad (7)$$

in which $$F'^{to} = \begin{bmatrix} F^{to}_{11} & F^{to}_{21} & F^{to}_{13} \\ F^{to}_{21} & F^{to}_{22} & F^{to}_{23} \\ F^{to}_{31} & F^{to}_{32} & F^{to}_{33} \end{bmatrix},$$

and the $F'^{to}$ is an orthogonal matrix.

7. The method according to claim 5, wherein the acquiring the coordinate of the central point of the calibrated tool in the flange coordinate system comprises:

acquiring a first rotation angle and a second rotation angle which are rotation angles of each joint of the robot when the calibrated tool respectively moves in a first direction and a second direction to where the central point of the calibrated tool overlaps with the calibration reference point;

substituting the first rotation angle and the second rotation angle respectively into the known forward kinematics equation of the robot, thereby acquiring transformation matrices $F^1$ and $F^2$ of the flange coordinate system of the robot relative to the world coordinate system, and establishing a following equation ①;

$$F^1 T \begin{bmatrix} 0 \\ 0 \\ 0 \\ 1 \end{bmatrix} = F^2 T \begin{bmatrix} 0 \\ 0 \\ 0 \\ 1 \end{bmatrix} = \begin{bmatrix} X \\ Y \\ Z \\ 1 \end{bmatrix}; \quad ①$$

in which T is a transformation matrix of a calibrated tool coordinate system relative to the flange coordinate system, and (X Y Z 1) is a coordinate of the calibration reference point in the world coordinate system; and calculating the coordinate $(X_{ca}\ Y_{ca}\ Z_{ca})$ of the central point of the calibrated tool in the flange coordinate system of the robot according a following equation ②;

$$(F^1 - F^2) \begin{bmatrix} X_{ca} \\ Y_{ca} \\ Z_{ca} \\ 1 \end{bmatrix} = \begin{bmatrix} 0 \\ 0 \\ 0 \\ 0 \end{bmatrix}. \quad ②$$

8. The method according to claim 7, wherein after the calculating the coordinate $(X_{ca}\ Y_{ca}\ Z_{ca})$ of the central point of the calibrated tool in the flange coordinate system of the robot according the equation ②, the method further comprises:

acquiring a third rotation angle and a fourth rotation angle which are rotation angles of each joint of the robot when the calibrated tool respectively moves in a third direction and a fourth direction to where the central point of the calibrated tool overlaps with the calibration reference point;

substituting the third rotation angle and the fourth rotation angle respectively into the known forward kinematics equation of the robot, thereby acquiring transformation matrices $F^3$ and $F^4$ of the flange coordinate system of the robot relative to the world coordinate system, and establishing a following equation ③;

$$F^3 T \begin{bmatrix} 0 \\ 0 \\ 0 \\ 1 \end{bmatrix} = F^4 T \begin{bmatrix} 0 \\ 0 \\ 0 \\ 1 \end{bmatrix} = \begin{bmatrix} X \\ Y \\ Z \\ 1 \end{bmatrix}; \quad ③$$

in which T is the transformation matrix of the calibrated tool coordinate system relative to the flange coordinate system, and (X Y Z 1) is the coordinate of the calibration reference point in the world coordinate system; obtaining a following equation ④ by arranging the equation ③, and again calculating a coordinate $(X'_{ca}\ Y'_{ca}\ Z'_{ca})$ of the central point of the calibrated tool in the flange coordinate system of the robot according the equation ④;

$$(F^3 - F^4) \begin{bmatrix} X'_{ca} \\ Y'_{ca} \\ Z'_{ca} \\ 1 \end{bmatrix} = \begin{bmatrix} 0 \\ 0 \\ 0 \\ 0 \end{bmatrix}; \quad ④$$

and acquiring a check coordinate $(X_{ch}\ Y_{ch}\ Z_{ch})$ of the central point of the calibrated tool in the flange coordinate system of the robot according to an average value between $(X_{ca}\ Y_{ca}\ Z_{ca})$ and $(X'_{ca}\ Y'_{ca}\ Z'_{ca})$, and determining the check coordinate $(X_{ch}\ Y_{ch}\ Z_{ch})$ of the central point of the calibrated tool in the flange coordinate system of the robot as a final coordinate of the central point of the calibrated tool in the flange coordinate system of the robot.

9. An apparatus for calibrating a tool in a flange coordinate system of a robot, wherein the robot comprises a mounting portion having an end joint; the apparatus comprising a memory storing a plurality of programs and a processor, wherein the programs when executed by the processor, cause the processor to perform operations, comprising:

acquiring a rotation angle of each joint of the robot when a to-be-calibrated tool fasted on the end joint of the mounting portion of the robot moves to where a central point of the to-be-calibrated tool overlaps with a calibration reference point;

acquiring calibration information of a central point of a calibrated tool in the flange coordinate system of the robot; and completing calibration of the central point of the to-be-calibrated tool in the flange coordinate system of the robot according to the calibration information of the central point of the calibrated tool and a rotation angle of the to-be-calibrated tool;

wherein the operations further comprise:

acquiring a rotation angle of the calibrated tool which is a rotation angle of each joint of the robot when the calibrated tool fasted on the end joint of the mounting portion of the robot moves to where the central point of the calibrated tool overlaps with the calibration reference point; and acquiring a coordinate of the central point of the calibrated tool in the flange coordinate system of the robot;

wherein the memory is only configured for pre-storing the rotation angle of the calibrated tool, and the coordinate acquisition unit timely calculates to obtain the coordinate of the central point of the calibrated tool in the flange coordinate system of the robot according to the rotation angle of the calibrated tool pre-stored in the memory; or the memory is simultaneously configured for pre-storing the coordinate of the central point of the calibrated tool in the flange coordinate system of the robot and the rotation angle of the calibrated tool.

10. The apparatus according to claim 9, wherein the operations further comprise:

acquiring calibration information of a central point of a first calibrated tool in the flange coordinate system of the robot; and completing calibration of the central point of the to-be-calibrated tool in the flange coordinate system of the robot according to the calibration information of the central point of the first calibrated tool and the rotation angle of the to-be-calibrated tool.

11. The apparatus according to claim 9, wherein the operations further comprise:
    acquiring calibration information of a central point of a previous calibrated tool in the flange coordinate system of the robot; and
    completing calibration of the central point of the to-be-calibrated tool in the flange coordinate system of the robot according to the calibration information of the central point of the previous calibrated tool and the rotation angle of the to-be-calibrated tool.

12. The apparatus according to claim 9, wherein the operations further comprise:
    acquiring calibration information of a central point of at least two previous calibrated tools in the flange coordinate system of the robot, and weighted-averaging the calibration information; and
    completing calibration of the central point of the to-be-calibrated tool in the flange coordinate system of the robot according to the weighted-averaged calibration information of the central point of the at least two previous calibrated tool and the rotation angle of the to-be-calibrated tool.

13. The apparatus according to claim 9, wherein the operations further comprise:
    substituting the rotation angle of the calibrated tool and the rotation angle of the to-be-calibrated tool respectively into a known forward kinematics equation of the robot, thereby acquiring transformation matrices $F^{ca}$ and $F^{to}$ of the flange coordinate system of the robot relative to a world coordinate system, and establishing a following equation ⑤;

$$F^{ca}\begin{bmatrix} X_{ca} \\ Y_{ca} \\ Z_{ca} \\ 1 \end{bmatrix} = F^{to}\begin{bmatrix} X_{to} \\ Y_{to} \\ Z_{to} \\ 1 \end{bmatrix}; \quad (5)$$

in which $(X_{to}\ Y_{to}\ Z_{to})$ is the coordinate of the central point of the to-be-calibrated tool in the flange coordinate system, the coordinate of the central point of the calibrated tool in the flange coordinate system is $(X_{ca}\ Y_{ca}\ Z_{ca})$, and the transformation matrix $F^{to}$ of the flange coordinate system of the robot relative to the world coordinate system is followed as an equation ⑥;

$$F^{to} = \begin{bmatrix} F^{to}_{11} & F^{to}_{21} & F^{to}_{13} & F^{to}_{14} \\ F^{to}_{21} & F^{to}_{22} & F^{to}_{23} & F^{to}_{24} \\ F^{to}_{31} & F^{to}_{32} & F^{to}_{33} & F^{to}_{34} \end{bmatrix}; \quad (6)$$

and
substituting the equation ⑥ into the equation ⑤ to acquire a following equation ⑦, thereby acquiring the coordinate $(X_{to} Y_{to} Z_{to})$ of the central point of the to-be-calibrated tool in the flange coordinate system;

$$\begin{bmatrix} X_{ca} \\ Y_{ca} \\ Z_{ca} \end{bmatrix} = (F'^{to})^T \left( F^{ca}\begin{bmatrix} X_{ca} \\ Y_{ca} \\ Z_{ca} \\ 1 \end{bmatrix} - \begin{bmatrix} F^2_{14} \\ F^2_{24} \\ F^2_{34} \end{bmatrix} \right); \quad (7)$$

in which $$F'^{to} = \begin{bmatrix} F^{to}_{11} & F^{to}_{21} & F^{to}_{13} \\ F^{to}_{21} & F^{to}_{22} & F^{to}_{23} \\ F^{to}_{31} & F^{to}_{32} & F^{to}_{33} \end{bmatrix},$$

and the $F'^{to}$ is an orthogonal matrix.

14. The apparatus according to claim 13, wherein the operations further comprise:
    acquiring a first rotation angle and a second rotation angle which are rotation angles of each joint of the robot when the calibrated tool respectively moves in a first direction and a second direction to where the central point of the calibrated tool overlaps with the calibration reference point;
    substituting the first rotation angle and the second rotation angle respectively into the known forward kinematics equation of the robot, thereby acquiring transformation matrices $F^1$ and $F^2$ of the flange coordinate system of the robot relative to the world coordinate system, and establishing a following equation ①;

$$F^1 T \begin{bmatrix} 0 \\ 0 \\ 0 \\ 1 \end{bmatrix} = F^2 T \begin{bmatrix} 0 \\ 0 \\ 0 \\ 1 \end{bmatrix} = \begin{bmatrix} X \\ Y \\ Z \\ 1 \end{bmatrix}; \quad (1)$$

in which T is a transformation matrix of a calibrated tool coordinate system relative to the flange coordinate system, and (X Y Z 1) is a coordinate of the calibration reference point in the world coordinate system; and
calculating the coordinate $(X_{ca} Y_{ca} Z_{ca})$ of the central point of the calibrated tool in the flange coordinate system of the robot according a following equation ②;

$$(F^1 - F^2)\begin{bmatrix} X_{ca} \\ Y_{ca} \\ Z_{ca} \\ 1 \end{bmatrix} = \begin{bmatrix} 0 \\ 0 \\ 0 \\ 0 \end{bmatrix}. \quad (2)$$

15. The apparatus according to claim 14, wherein after the calculating the coordinate $(X_{ca} Y_{ca} Z_{ca})$ of the central point of the calibrated tool in the flange coordinate system of the robot according the equation ②, the operations further comprise:
    acquiring a third rotation angle and a fourth rotation angle which are rotation angles of each joint of the robot when the calibrated tool respectively moves in a third direction and a fourth direction to where the central point of the calibrated tool overlaps with the calibration reference point;
    substituting the third rotation angle and the fourth rotation angle respectively into the known forward kinematics equation of the robot, thereby acquiring transformation matrices $F^3$ and $F^4$ of the flange coordinate system of the robot relative to the world coordinate system, and establishing a following equation ③;

$$F^3 T \begin{bmatrix} 0 \\ 0 \\ 0 \\ 1 \end{bmatrix} = F^4 T \begin{bmatrix} 0 \\ 0 \\ 0 \\ 1 \end{bmatrix} = \begin{bmatrix} X \\ Y \\ Z \\ 1 \end{bmatrix}; \quad (3)$$

in which T is the transformation matrix of the calibrated tool coordinate system relative to the flange coordinate system, and (X Y Z 1) is the coordinate of the calibration reference point in the flange coordinate system of the robot;

obtaining a following equation ④ by arranging the equation ⑤ and again calculating a coordinate ($X'_{ca}$ $Y'_{ca}$ $Z'_{ca}$) of the central point of the calibrated tool in the flange coordinate system of the robot according the equation ④;

$$(F^3 - F^4) \begin{bmatrix} X'_{ca} \\ Y'_{ca} \\ Z'_{ca} \\ 1 \end{bmatrix} = \begin{bmatrix} 0 \\ 0 \\ 0 \\ 0 \end{bmatrix}; \quad (4)$$

and acquiring a check coordinate ($X_{ch}$ $Y_{ch}$ $Z_{ch}$) of the central point of the calibrated tool in the flange coordinate system of the robot according to an average value between ($X_{ca}$ $Y_{ca}$ $Z_{ca}$) and ($X'_{ca}$ $Y'_{ca}$ $Z'_{ca}$), and determining the check coordinate ($X_{ch}$ $Y_{ch}$ $Z_{ch}$) of the central point of the calibrated tool in the flange coordinate system of the robot as a final coordinate of the central point of the calibrated tool in the flange coordinate system of the robot.

16. A workpiece processing system, comprising a robot, a calibrated tool, a to-be-calibrated tool and an apparatus for calibrating the tool in the flange coordinate system of the robot, wherein the robot comprises a mounting portion having an end joint the apparatus comprising a memory storing a plurality of programs and a processor, wherein the programs when executed by the processor, cause the processor to perform operations, comprising:

acquiring a rotation angle of each joint of the robot when a to-be-calibrated tool fasted on the end joint of the mounting portion of the robot moves to where a central point of the to-be-calibrated tool overlaps with a calibration reference point;

acquiring calibration information of a central point of a calibrated tool in the flange coordinate system of the robot; and completing calibration of the central point of the to-be-calibrated tool in the flange coordinate system of the robot according to the calibration information of the central point of the calibrated tool and a rotation angle of the to-be-calibrated tool;

wherein the operations further comprise:

acquiring a rotation angle of the calibrated tool which is a rotation angle of each joint of the robot when the calibrated tool fasted on the end joint of the mounting portion of the robot moves to where the central point of the calibrated tool overlaps with the calibration reference point; and acquiring a coordinate of the central point of the calibrated tool in the flange coordinate system of the robot;

wherein the memory is only configured for pre-storing the rotation angle of the calibrated tool, and the coordinate acquisition unit timely calculates to obtain the coordinate of the central point of the calibrated tool in the flange coordinate system of the robot according to the rotation angle of the calibrated tool pre-stored in the memory; or the memory is simultaneously configured for pre-storing the coordinate of the central point of the calibrated tool in the flange coordinate system of the robot and the rotation angle of the calibrated tool.

* * * * *